(12) United States Patent
Christiansen et al.

(10) Patent No.: US 6,259,578 B1
(45) Date of Patent: Jul. 10, 2001

(54) AUTOMATIC CARTRIDGE FEEDER WITH PRIORITY SLOT

(75) Inventors: Dale Allen Christiansen; Kenneth Dean Cummings; David Conrad Graves; James Lee Lentz; Donald Ernest Lockett; Guillermo Santamaria Robles, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1310 days.

(21) Appl. No.: 08/664,279

(22) Filed: Jun. 11, 1996

Related U.S. Application Data

(63) Continuation of application No. 08/425,307, filed on Apr. 17, 1995, now abandoned, which is a continuation of application No. 08/106,256, filed on Aug. 13, 1993, now abandoned.

(51) Int. Cl.[7] .................................................. G11B 15/68
(52) U.S. Cl. ............................................................ 360/92
(58) Field of Search .................................. 360/92, 98.04, 360/98.05, 98.06; 369/34, 36, 178, 192

(56) References Cited

U.S. PATENT DOCUMENTS

| | | | |
|---|---|---|---|
| 4,071,857 | | 1/1978 | Whitney et al. ........................ 360/92 |
| 4,636,888 | * | 1/1987 | Sidebottom ............................ 360/92 |
| 4,797,865 | * | 1/1989 | Imai et al. ............................. 369/36 |
| 5,258,882 | * | 11/1993 | Apple et al. ........................... 360/92 |
| 5,353,269 | * | 10/1994 | Kobayashi et al. .................... 369/36 |

FOREIGN PATENT DOCUMENTS

| | | |
|---|---|---|
| 0 392 620 | 10/1990 | (EP) . |
| 0 529 762 | 3/1993 | (EP) . |
| 0 541 208 | 5/1993 | (EP) . |

OTHER PUBLICATIONS

"Installation, Configuration and De-installation," in *Independence Cartridge Tape Subsystem Hardware Maintenance Manual*, Laser Magnetic Storage International Company, Aug. 1991, pp. 88–99.

* cited by examiner

Primary Examiner—George J. Letscher
(74) Attorney, Agent, or Firm—Dan Hubert & Assoc.

(57) ABSTRACT

An automatic cartridge feeder includes a magazine slot that receives a cartridge magazine and includes a priority slot that directly receives single cartridges. The automatic cartridge feeder can receive a cartridge through the priority slot regardless of the condition of the cartridge magazine. In an automatic mode, cartridges are taken sequentially from the magazine and are processed. Any cartridge placed in the priority slot by an operator will be processed immediately after any in-progress cartridge processing. In an accumulate mode, cartridges are received through the priority slot for processing and are returned in sequence to an empty cartridge magazine.

41 Claims, 12 Drawing Sheets

AUTOMATIC CARTRIDGE FEEDER WITH PRIORITY SLOT

CROSS-REFERENCE TO RELATED APPLICATION

This application is a continuation of application U.S. Ser. No. 08/425,307 filed Apr. 17, 1995, now abandoned, which is a continuation of application U.S. Ser. No. 08/106,256 filed Aug. 13, 1993, now abandoned.

This application is related to application Ser. No. 08/068,366 entitled "Cartridge Magazine with Cartridge Processing Status Indicator" filed May 27, 1993 by Donald C. Acosta and Paul Yu-Fei Hu, assigned to IBM Corporation.

BACKGROUND OF THE INVENTION

1. Field of the Invention

This invention relates generally to automatic data cartridge feeders for use with drive units and, more particularly, to automatic cartridge feeders that receive cartridges and transport them to and from a drive unit for processing.

2. Description of the Related Art

Computer system tape drive units can be configured to receive tape cartridges, such as IBM Corporation 3480 and 3490E cartridges. The cartridges contain a length of magnetic tape upon which data can be written and read. Many tape drive units can mate with an automatic cartridge feeder that accepts a tape cartridge and transports it to the drive unit tape transport mechanism and read/write heads. Automatic cartridge feeders are available in configurations that accept cartridges one at a time through a single feed slot and configurations that mate with removable cartridge magazines, containing a plurality of tape cartridges, from which cartridges are accepted one at a time.

Automatic cartridge feeders having a feed slot for single cartridges permit an operator to sequentially insert tape cartridges that are automatically transported to the drive unit. In this way, the operator has complete control over the next cartridge to be processed and can interrupt a planned sequence of cartridges at any time to insert a high priority cartridge or to otherwise process a cartridge out of turn. An automatic cartridge feeder with only a single feed slot can be very inefficient, however, because an operator is occupied substantially the entire time the drive unit is being used. Moreover, loose cartridges can be lost, mishandled, or placed out of sequence.

Automatic cartridge feeders that accept removable cartridge magazines can greatly increase operating efficiency. A cartridge magazine typically includes a plurality of cartridge shelves, each of which receives a cartridge, and is coupled to the cartridge feeder such that the cartridge feeder can transport cartridges from the magazine to the drive unit in the sequence they are stored in the magazine or in a sequence selected by the drive unit. Typical magazines have a capacity of seven to twelve cartridges. The cartridge magazine frees an operator from being occupied with the feeder and drive unit and also reduces the number of times an operator must manually intervene to provide fresh cartridges. Unfortunately, once a cartridge magazine is mounted to a cartridge feeder, there is no quick and efficient way to process a particular priority cartridge that is not already in the magazine. Typically, an operator must remove the magazine, insert a desired cartridge in the next shelf to be processed, and replace the magazine back with the cartridge feeder. It therefore is necessary to know which cartridge will be processed next so it can be removed and replaced with the desired priority cartridge. It can be very difficult to carry out such remove and replace operations without interfering with ongoing tape operations. Thus, unlike an automatic cartridge feeder with a single feed slot, an automatic cartridge feeder with a magazine can make if difficult to get a particular tape cartridge to be used next.

It is known to designate one shelf of a cartridge magazine as a priority shelf. See, for example, the Laser Magnetic Storage International Company Hardware Maintenance Manual for their Independence-brand Cartridge Tape Subsystem. In a typical cartridge feeder with a magazine having a designated priority shelf, the feeder can be operated in a priority mode, in which a cartridge that is unprocessed and is on the priority shelf (a "priority cartridge") will be the next cartridge processed after processing of a current cartridge is completed, and also in a sequential mode, in which all shelves of the magazine are processed in sequence. In the priority mode, after the priority cartridge is processed, the remaining cartridges in the magazine are processed in accordance with normal operation. To insert a cartridge for priority processing, access to the magazine shelves is first achieved by opening an access door, unlocking the shelves, or otherwise permitting access to the magazine shelves.

If the feeder is operated in sequential mode and a priority cartridge must be processed out of turn, any cartridge placed on the priority shelf of the magazine as part of the predetermined sequence of cartridges to be processed must be removed before the priority cartridge is inserted into the priority shelf and the operating mode is changed. This destroys any predetermined sequencing of the cartridges in the magazine. It also provides an opportunity to lose or mishandle the cartridge removed from the magazine, which now has no convenient place for safekeeping. These problems can be avoided by reserving one shelf at all times for use only as the priority shelf. Reserving one magazine shelf as a priority shelf, however, reduces the effective cartridge capacity of the magazine. Conversely, it can be cumbersome and time-consuming to process a priority cartridge if all of the magazine shelves are routinely used for predetermined cartridge sequences and no shelf is reserved as a priority shelf.

As noted above, removable cartridge magazines increase efficiency by freeing an operator from attending to the automatic cartridge feeder and drive unit. Automated cartridge library systems include a robot that loads cartridges onto moving belt, which carries the cartridges one at a time to a cartridge feeder having a single feed slot. The robot can retrieve cartridges from a cartridge library and deliver them to the belt without operator intervention, thereby increasing efficiency. It would be advantageous if a robot-operated automatic cartridge library system could use feeders that are compatible with cartridge magazines. In this way, the advantages of cartridge magazine feeder systems over single feed slot feeder systems could be extended to cartridge library systems. Conventional feeder systems that are compatible with cartridge magazines are not compatible with robot-operated cartridge library systems. Conventional cartridge magazine feeder systems include access doors and magazine lock bars to ensure cartridge magazine integrity. These features, as well as other configuration details, make such systems incompatible with robot-operated cartridge library systems.

From the discussion above, it should be apparent that there is a need for an automatic cartridge feeder with magazine loading that permits single feeding of cartridges without reducing effective magazine capacity and without altering a predetermined sequence of cartridges in the magazine when priority processing is desired and that also is compatible with automated cartridge library systems. The present invention satisfies this need.

SUMMARY OF THE INVENTION

The present invention provides an automatic cartridge feeder that accepts a removable cartridge magazine and also has a separate priority slot that can receive a cartridge for priority processing regardless of the cartridge magazine condition. Because the priority slot is separate from the cartridge magazine, a priority cartridge can be inserted in the priority slot at any time and processed with minimal interruption to the magazine processing and with no alteration to the predetermined sequence of cartridges in the magazine. In this way, all the shelves of the magazine can be used for processing a predetermined sequence of cartridges and a cartridge does not need to be removed from the magazine before a priority cartridge can be accepted by the feeder. Moreover, for priority processing it is unnecessary for the operator to determine which cartridge in the magazine will be processed next, because the automatic cartridge feeder will automatically select the cartridge in the priority slot as the next cartridge to be processed. Finally, the shelves of the cartridge magazine and the priority slot are located such that the robot of an automated cartridge library system can insert and withdraw cartridges from the shelves of an engaged magazine and from the priority slot.

In another aspect of the invention, an automatic cartridge feeder with a priority slot and a magazine provides an operating mode in which an empty magazine can be attached to the feeder and cartridges can be inserted into the priority slot for processing and then returned to a next unoccupied shelf in the magazine. In this way, any sequence of cartridges desired can be processed and can be accumulated in the magazine. This feature increases the flexibility of operating the automatic cartridge feeder and provides single slot processing without concern over misplacing or mishandling cartridges while preserving the sequence in which cartridges were inserted.

Other features and advantages of the present invention should be apparent from the following description of the preferred embodiment, which illustrates, by way of example, the principles of the invention.

DESCRIPTION OF THE PREFERRED EMBODIMENT

Figure 1:
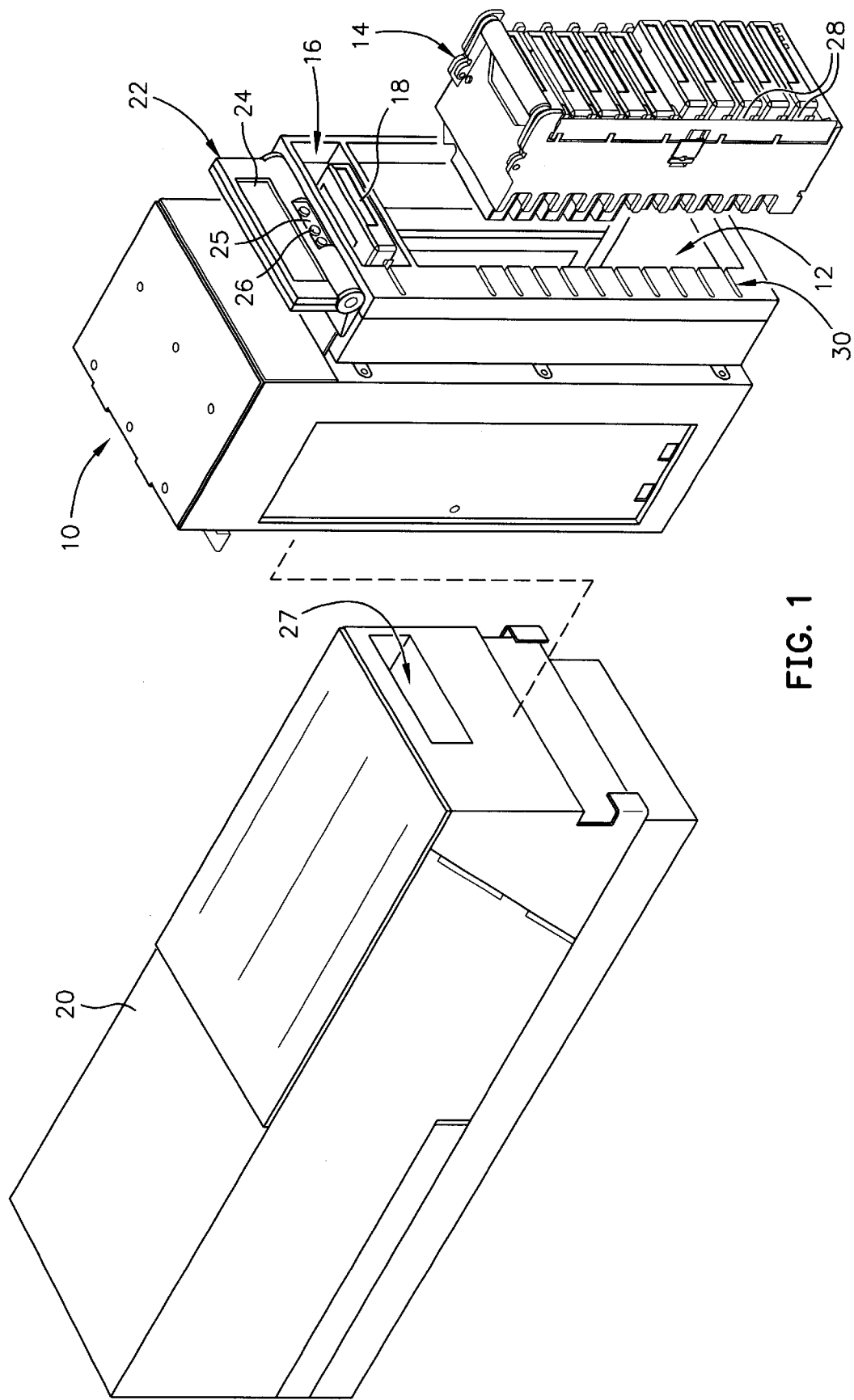
FIG. 1 is a perspective view of an automatic cartridge feeder and magazine constructed in accordance with the present invention, along with a drive unit to which they are attached.

In FIG. 1, an automatic cartridge feeder 10 constructed in accordance with the present invention includes a magazine slot 12 for mating with a cartridge magazine 14 and includes a priority slot 16 for receiving a cartridge 18 manually inserted therein. The tape cartridge can comprise, for example, an IBM Corporation 3480 or 3490E tape cartridge. The automatic cartridge feeder is adapted for engagement with a drive unit 20, which contains a tape transport mechanism and read/write heads. The cartridge magazine 14 can be filled with cartridges for processing by the drive unit. When the magazine is mated with the magazine slot 12 of the automatic cartridge feeder 10, cartridges are automatically removed from the magazine, transported to the drive unit and processed, and then returned to the magazine. At any time during such operations, a cartridge can be manually inserted into the priority slot 16 and will be transported to the drive unit and processed after the processing of any magazine cartridge then in progress in the drive unit is completed and the magazine cartridge is returned to the magazine.

FIG. 1 shows that the automatic cartridge feeder 10 includes a display assembly 22 having a liquid crystal display (LCD) panel 24 and a control panel 25 having control buttons 26. The LCD panel is used to display system messages and instructions to an operator. The control buttons 26 are used by an operator to change operating modes, begin and stop procedures, and otherwise control the operation of the cartridge feeder. The display assembly 22 is pivotable for adjustment of viewing angle. Cartridges from the feeder enter and leave the drive unit 20 through an interface slot 27.

The cartridge magazine 14 includes a plurality of cartridge shelves 28, each of which can support a cartridge 18. The cartridge feeder 10 includes a plurality of cartridge status indicators 30 located such that an indicator is adjacent the priority slot 16 and adjacent each shelf of a magazine when the magazine is mated with the cartridge feeder. The cartridge status indicators are used to inform an operator about the status of the cartridge associated with the indicator. For example, in the preferred embodiment, a cartridge status indicator is steadily illuminated green if the cartridge associated with the indicator is then being processed in the drive unit 20. An indicator is not illuminated if its associated cartridge has already been processed by the drive unit and has been returned to the magazine. An "alert condition" can be indicated by steadily illuminating the indicator yellow, while a more urgent "attention condition" can be indicated by flashing the indicator yellow.

Figure 2:
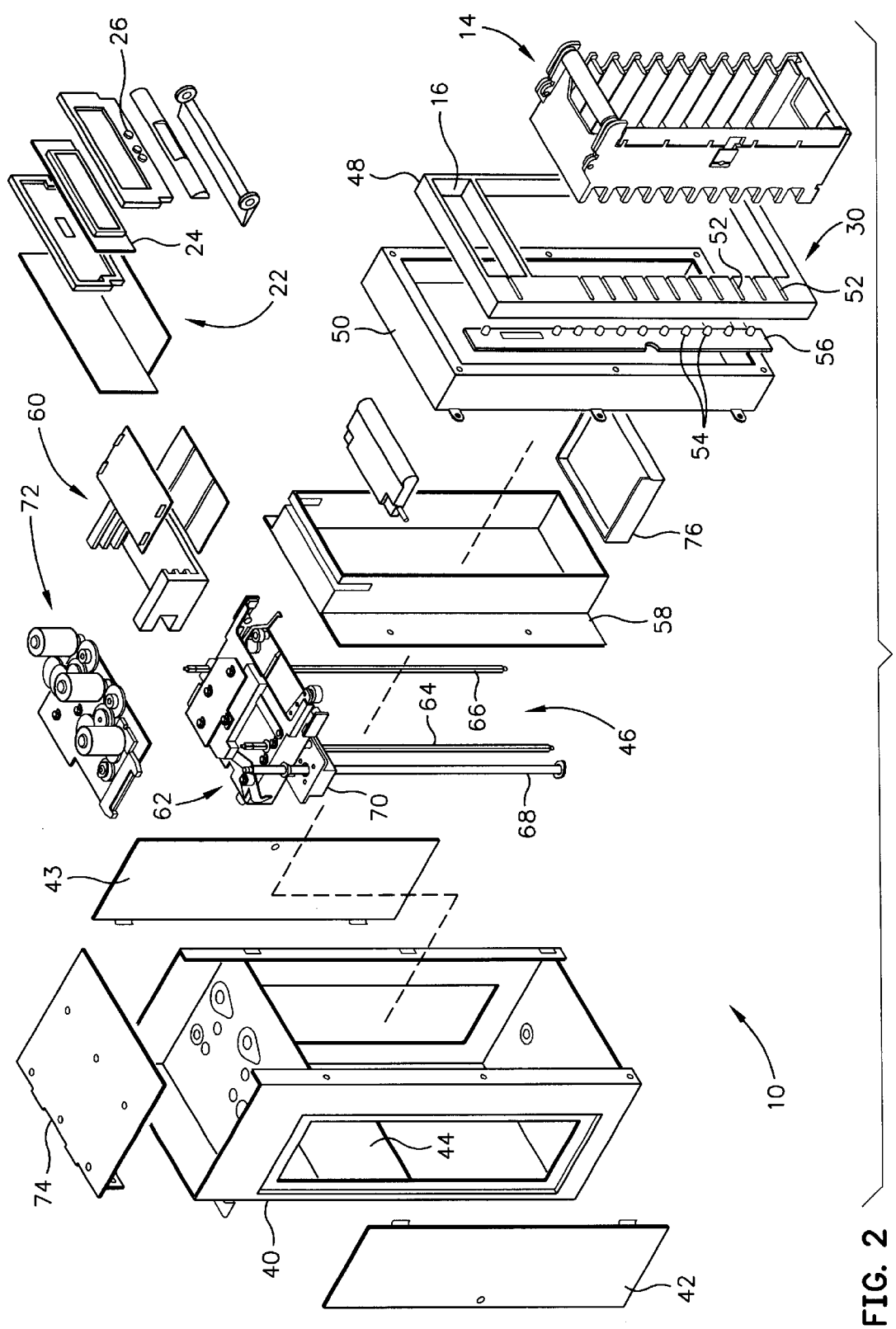
FIG. 2 is an exploded perspective diagram of the automatic cartridge feeder illustrated in FIG. 1.

FIG. 2 shows the cartridge feeder 10 in greater detail, along with a cartridge magazine 14. The drive unit 20 is not shown in FIG. 2 for simplicity. FIG. 2 shows that the cartridge feeder 10 includes a housing 40 to which the remaining feeder components are attached. A side panel 42 of the cartridge feeder has been removed to reveal a rear opening 44 in the housing. An opposite side panel 43 also is removed in FIG. 2. The rear opening comprises a feeder/drive unit interface through which cartridges are delivered to the interface slot 27 of the drive unit 20 (FIG. 1). That is, cartridges 18 that are removed from the priority slot 16 or from a shelf of the magazine 14 are transported through the cartridge feeder and are physically placed into the drive unit through the feeder rear opening 44. A feeder transport assembly 46 is used for all movement of cartridges within the cartridge feeder, including removal and return of cartridges from the priority slot and the cartridge magazine, and also transport of cartridges to and withdrawal of cartridges from the drive unit.

FIG. 2 shows that the front portion of the cartridge feeder 10 comprises a cartridge feeder bezel 48 including the priority slot 16 and the cartridge status indicators 30. The cartridge feeder bezel attaches to a bezel shroud 50. FIG. 2 shows that the cartridge status indicators 30 comprise a slotted indicator window 52 in the bezel adjacent each cartridge receiving position, such positions including the priority slot 16 and the shelves 28 of the cartridge magazine 14 when it is inserted into the feeder. In the preferred embodiment, each cartridge status indicator is illuminated by a two-color light emitting diode (LED) 54 mounted on an indicator board 56 that is attached to the bezel shroud behind the cartridge feeder bezel 48. The bezel 48 and bezel shroud 50 attach to a magazine slot frame 58 that in turn is attached to the cartridge feeder housing 40.

Cartridges that are inserted into the priority slot 16 are received by a priority slot assembly 60. The priority slot assembly holds a cartridge in a position so the cartridge can be removed from the slot assembly by a cartridge feeder tray 62 of the cartridge transport assembly 46 and transported through the rear opening 44 to the drive unit 20 (FIG. 1). Similarly, the cartridge magazine 14 itself holds cartridges on the shelves in position so they also can be removed from a magazine shelf by the cartridge feeder tray and transported through the rear opening 44.

The cartridge feeder tray 62 is coupled to three vertical shafts 64, 66, and 68. Two of the vertical shafts 64 and 66 are mounted on opposite sides of the feeder tray 62 and ensure proper positioning and vertical travel of the feeder tray. The third vertical shaft 68 is a threaded lead screw that is coupled to the tray by a fixed nut 70. A system of drive motors 72 rotates the threaded lead screw 68. Because the nut 70 is fixed in place relative to the feeder tray 62, the tray is moved vertically as the shaft 68 is rotated by the motors 72. As known to those skilled in the art, the lead screw 68 can be coupled to the feeder tray 62 so that rotation of the lead screw also can cause horizontal movement of the tray when a cartridge is to be removed or returned from the magazine 14 or priority slot 16 and when a cartridge is to be withdrawn or inserted into the drive unit. The top of the cartridge feeder housing 40 is closed with a feeder cover 74, to which is attached the display assembly 22. Finally, the bottom of the housing 40 is closed with a bottom cover 76.

Figure 3:
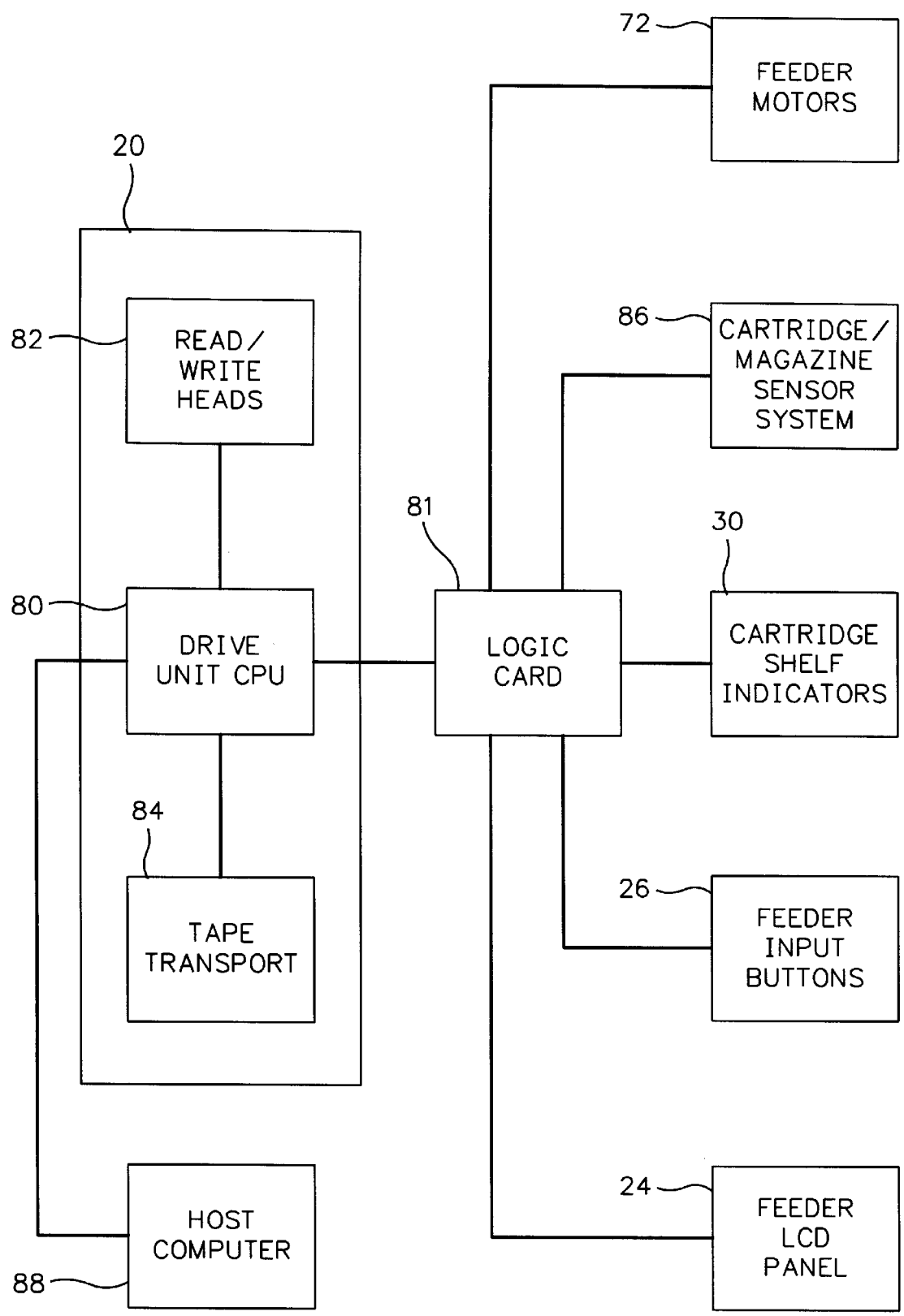
FIG. 3 is a functional block diagram of the cartridge feeder and drive unit illustrated in FIG. 1.

Operation of the automatic cartridge feeder 10 will be further understood with reference to the block diagram of FIG. 3. FIG. 3 shows that the cartridge feeder 10 does not include a dedicated microprocessor, rather, all cartridge feeder operations are performed under control of the drive unit 20. In particular, a drive unit central processor unit (CPU) 80 communicates with the feeder through a logic card 81 interface. It is to be understood, therefore, that references to the feeder taking action or completing tasks refer to operation of feeder components under control of the drive unit CPU. It also is to be understood that the automatic cartridge feeder can be constructed so that it also includes a central processor unit that controls some or all of the feeder operations.

In addition to controlling the feeder 10, the drive unit CPU also controls read/write heads 82 of the drive unit and controls a tape transport mechanism 84 of the drive unit. The tape transport mechanism winds tape around the heads and controls the tape direction. It is to be understood that if the cartridges handled by the cartridge feeder are not tape cartridges, then the drive unit would include other systems for appropriate processing. For example, magnetic disks would be handled by a disk drive rather than a tape transport. FIG. 3 also shows that the drive unit CPU 80 controls the feeder motors 72, drives the cartridge feeder LCD panel 24, receives inputs from the cartridge feeder input buttons 26, controls the cartridge status indicators 30, and controls a cartridge/magazine sensor system 86 of the feeder transport assembly 46. The sensor system will be described in greater detail below. FIG. 3 also shows that the drive unit CPU 80 is coupled to a host computer 88, also referred to as an initiator, from which the drive unit can receive commands and requests for data.

Figure 4:
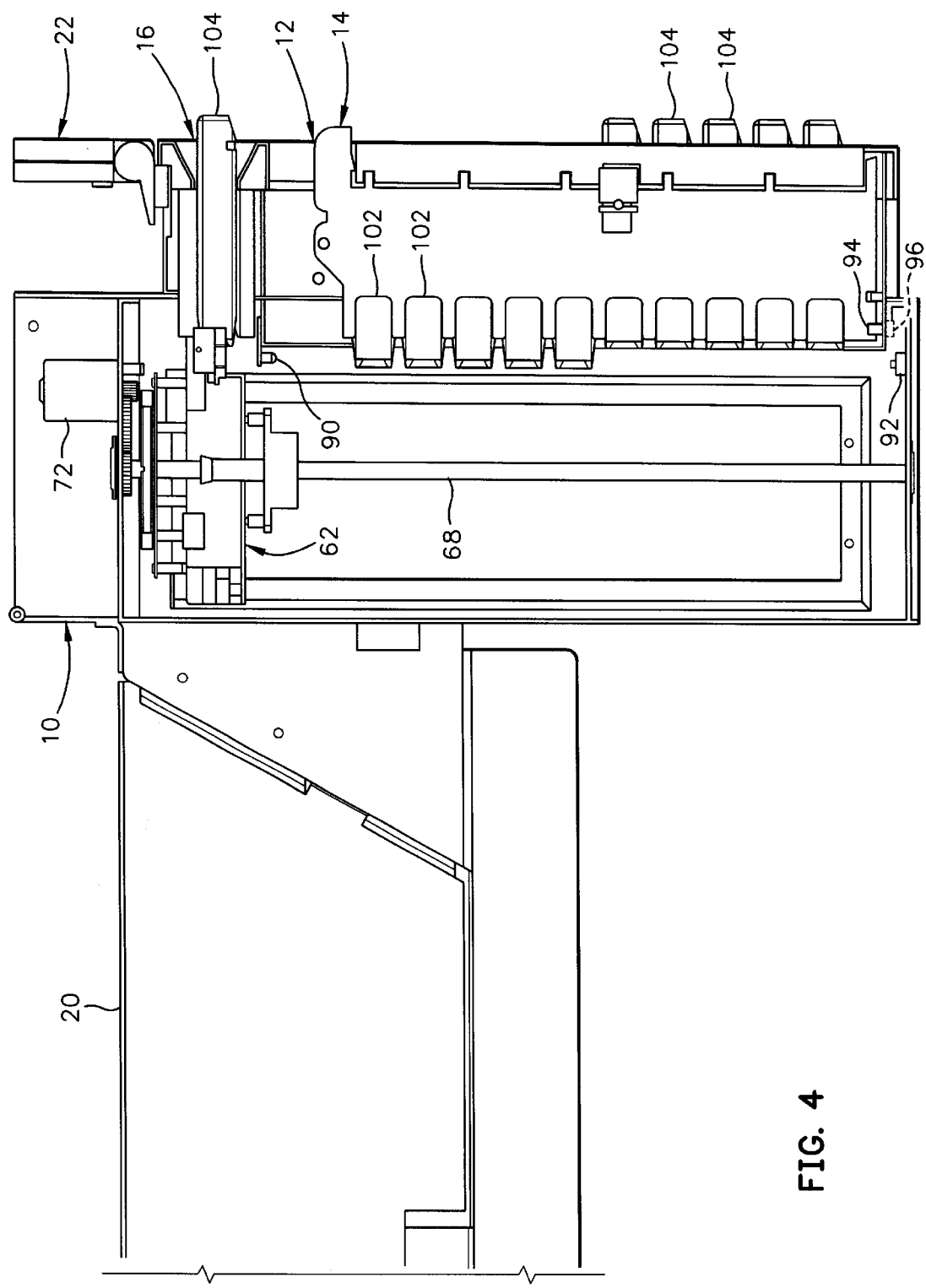
FIG. 4 is a cross-sectional view of the automatic cartridge feeder and magazine illustrated in FIG. 1.

FIG. 4 shows additional details of construction in a cross-sectional view of the cartridge feeder 10 with a cartridge magazine 14 inserted into the feeder receiving slot 12 and the feeder engaged with the drive unit 20. FIG. 4 shows that, when the feeder tray 62 is in position to receive a cartridge 18 from the priority slot 16, the feeder tray also is in position to immediately transfer that cartridge to the tape transport 84 of the drive unit 20 without vertical movement. The transfer is accomplished by horizontally moving the feeder tray toward the drive unit 20. In this way, the time needed to move a cartridge from the priority slot into the drive unit is reduced. Depending on the operating mode selected, the feeder tray 62 can move from its initial, or home, position adjacent the priority slot 16 shown in FIG. 4 to a position adjacent any one of the magazine shelves 28, withdraw a cartridge from the magazine shelf, and then rise to the home position and move toward the drive unit.

Figure 5:
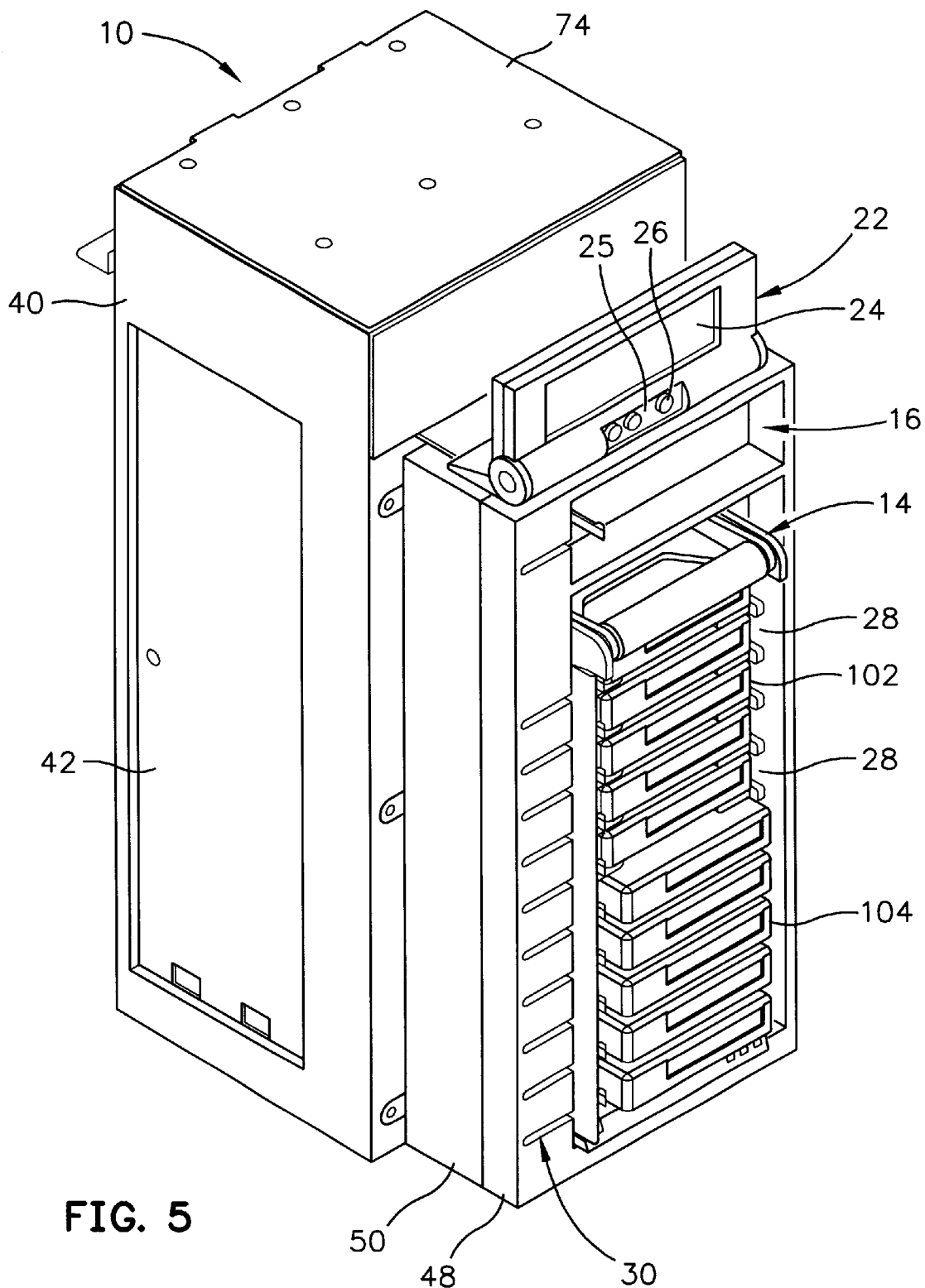
FIG. 5 is a perspective view of the cartridge feeder and magazine illustrated in FIG. 1.

FIG. 4 and FIG. 5, which shows a cartridge magazine 14 inserted into the cartridge feeder 10, illustrate the two positions in which a cartridge can be retained in either the priority slot 16 or a cartridge shelf 28. The two positions are referred to as the import position and the export position. Some of the cartridges 102 are shown in the import position, a position assumed by a cartridge when the cartridge is inserted into the cartridge magazine by an operator so it can be received by the feeder tray 62. In the import position, the outside edge of the cartridge is approximately flush with the edge of the cartridge magazine and is ready for processing. Some of the cartridges 104 are shown in the export position. In the export position, the outside edge of a cartridge extends from the cartridge magazine (or the priority slot) by a relatively short distance, such as 16 millimeters. The export position is the position assumed by a cartridge when it is returned to either the priority slot or a magazine shelf after it has been processed by the drive unit 20. The export position facilitates removal of the cartridge by an operator.

FIG. 4 shows that the priority slot 16 and the shelves 28 of the cartridge magazine 14 are configured such that the outer edge of the cartridge in the export position 104 will be aligned in the same vertical plane regardless of whether the cartridge is in the priority slot or in a magazine shelf. Hence, cartridges in the import position 102 also are vertically aligned regardless of whether they are in the priority slot or in a magazine shelf. This alignment, along with the lack of an access door and any other obstructions, permits the cartridge feeder 10 and cartridge magazine 14 to be compatible with robot-operated automatic cartridge library systems. Robots can be programmed to retrieve cartridges from a library and then remove and insert cartridges into either the priority slot or a magazine shelf because the relative vertical positions of the priority slot and magazine shelves is known and the horizontal reach necessary to remove and insert cartridges is fixed for both. In this way, the advantages of cartridge magazines in terms of increased efficiency are also extended to cartridge library systems.

FIG. 4 also shows that the cartridge feeder 10 includes a global cartridge detecting system comprising an emitter 90 and a receiver 92, as well as a magazine detecting system comprising an emitter 94 and a receiver 96 (shown in phantom). These two systems are part of the cartridge/ magazine sensor system 86 illustrated in the block diagram of FIG. 3. The cartridge detecting system emitter 90 emits a light beam that is directed to the cartridge detecting system receiver 92. If an attached cartridge magazine 14 includes a cartridge in any magazine shelf 28 in the unprocessed, import position 102, then the beam from the emitter 90 is interrupted and is not received by the receiver 92. This indicates to the drive unit CPU 80 that one of the magazine shelves contains an unprocessed cartridge. In a similar way, the magazine emitter 94 and receiver 96 indicate to the drive unit CPU if a magazine 14 is mated with the feeder 10. If a magazine is not mated with the feeder, then the beam emitted by the magazine sensor 94 is received by the receiver 96, which is located in the feeder horizontally across from the emitter. If a magazine 14 is mated with the feeder, then the beam from the emitter 94 is interrupted and is not received by the receiver 96. This indicates to the drive unit CPU that a magazine is mated with the feeder. The indications from these sensor systems are critical for operation of the feeder operating modes, which are described in greater detail below.

Figure 6:
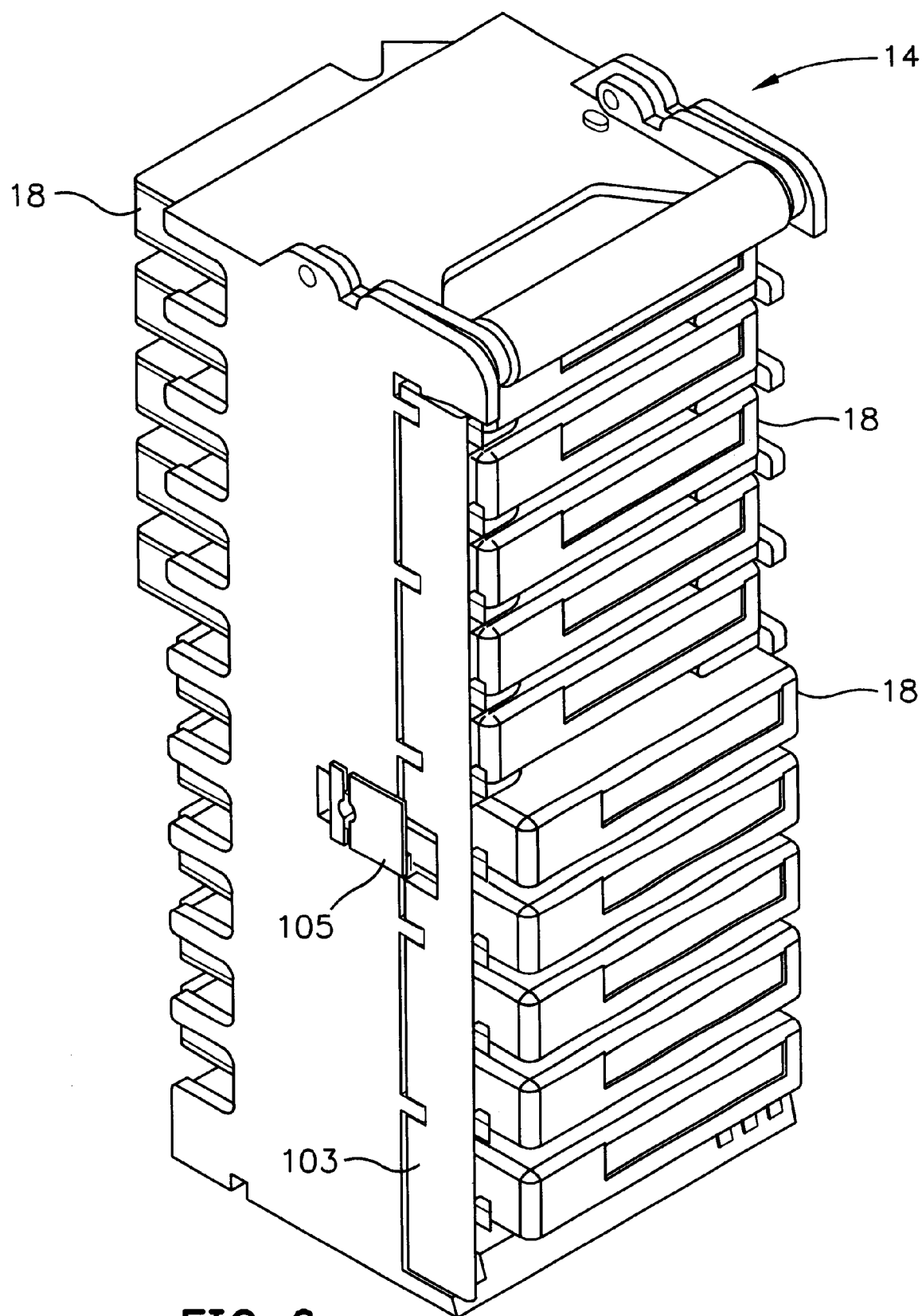
FIGS. 6, 7, and 8 are perspective views of a cartridge magazine for use with the automatic cartridge feeder illustrated in FIG. 1.
Figure 7:
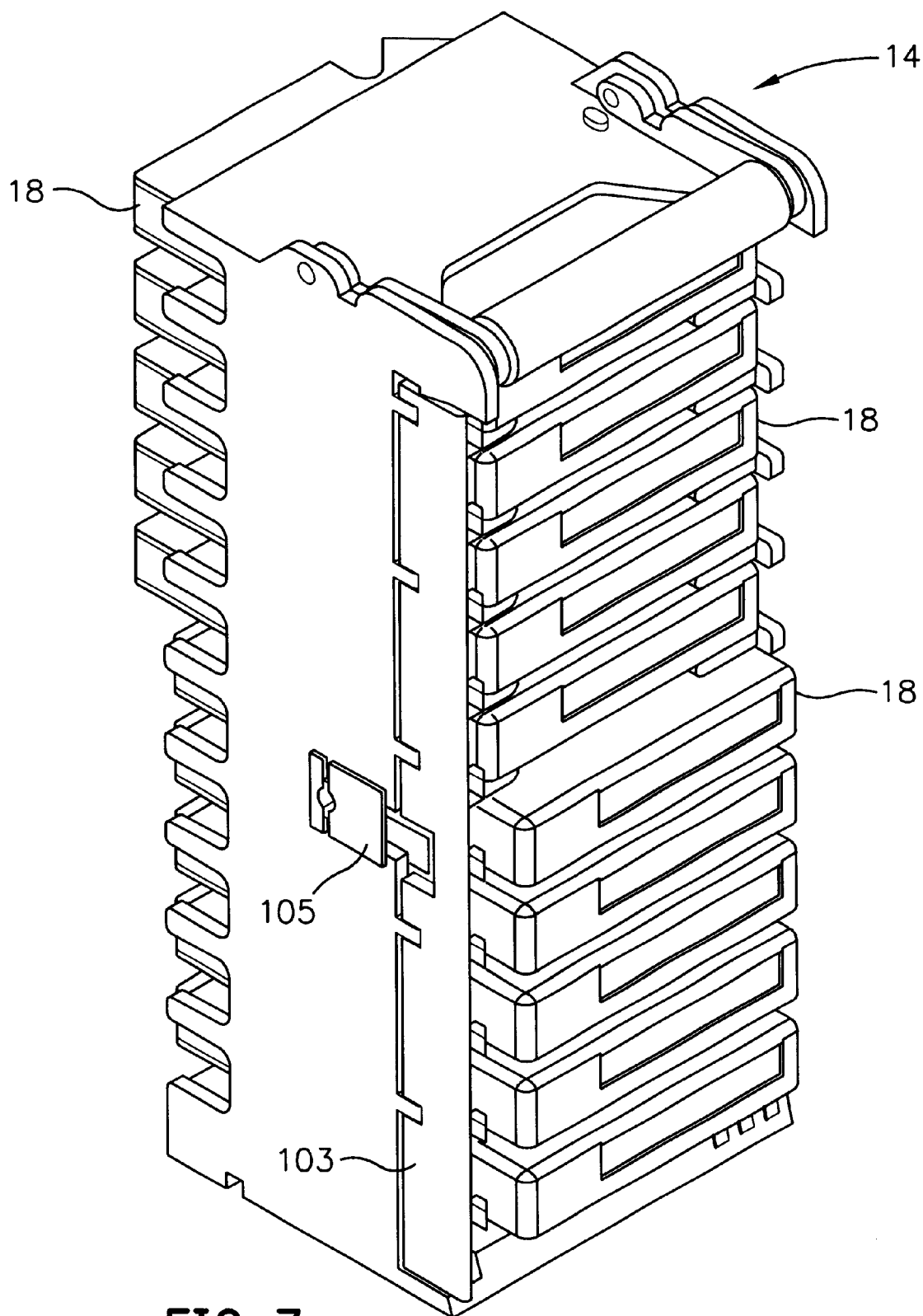
Figure 8:
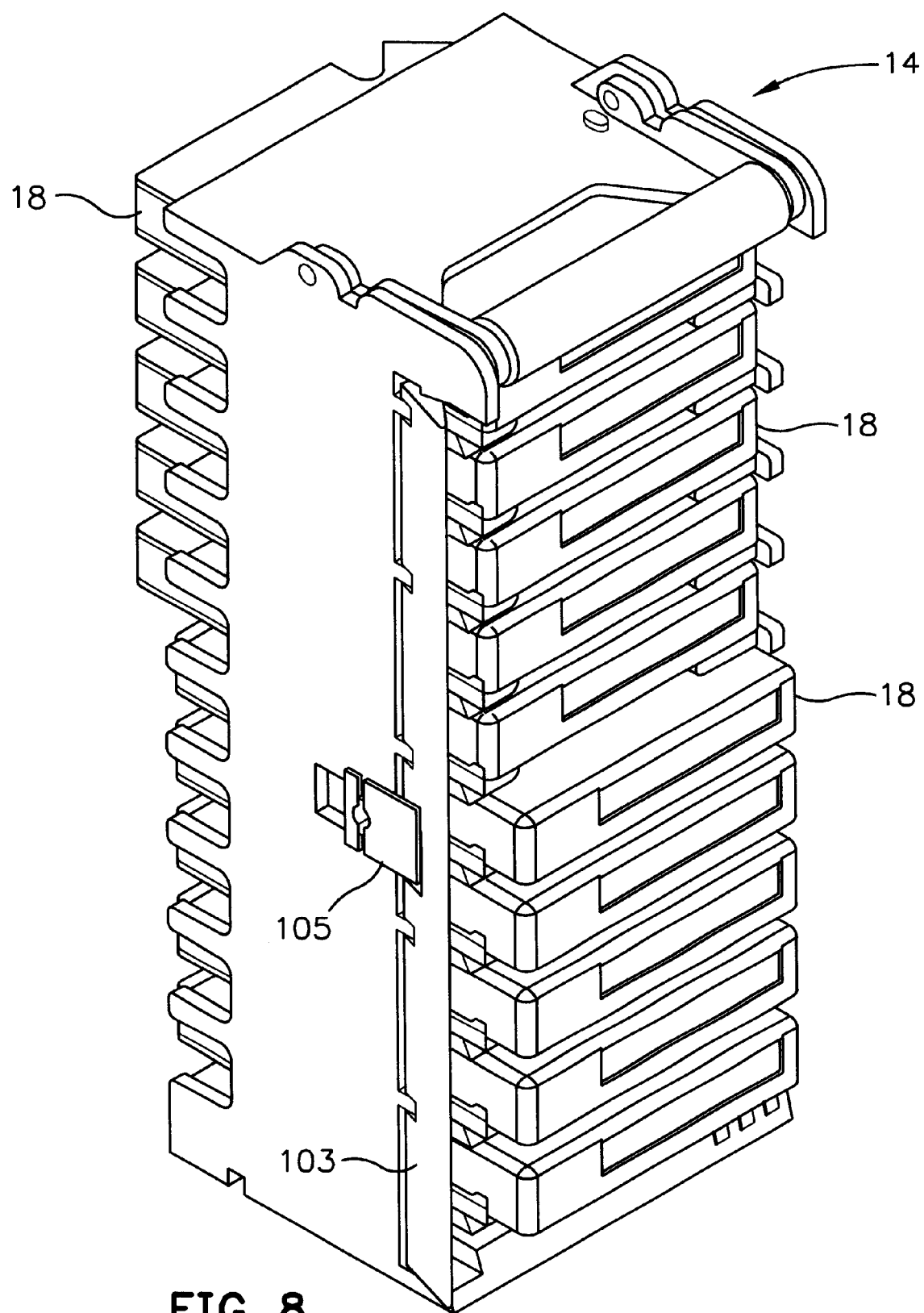

FIG. 6, FIG. 7, and FIG. 8 show a cartridge magazine 14 and in particular illustrate the cartridge lock feature of the magazine. The cartridge lock comprises a pivotable bar 103 that extends along the vertical length of the cartridge magazine and engages a detent in each cartridge. An operator moves the bar to one of three positions with lock arm 105 before the magazine is mated with the feeder. The cartridge lock is designed such that, if the lock is in a closed position illustrated in FIG. 6 or in a free position illustrated in FIG. 7 and the cartridge magazine is removed from the cartridge feeder, then each cartridge 18 is locked into whatever physical position, either the import position or export position, the cartridge happens to be in at the time of cartridge magazine removal. If the lock is in the open position when the cartridge magazine 14 is installed in the cartridge feeder 10, then the transport lock feature is disabled. Therefore, cartridges can be freely removed and installed by an operator while the magazine is mated with the feeder. When the magazine is not mated with the feeder, cartridges can be removed and inserted only if the cartridge lock is in the open position illustrated in FIG. 8. In this way, the cartridge lock feature ensures that all cartridges will be prevented from inadvertently falling out of the cartridge magazine when the magazine is being transported. Moreover, an operator can quickly determine which cartridges have been processed by the cartridge feeder and which cartridges have not been processed. The processing status is readily discernible because an operator knows that those cartridges still in the import position have not yet been processed by the cartridge feeder, whereas those cartridges in the export position have already been transported to the drive unit, processed by the drive unit, and subsequently returned to either the priority slot or a magazine shelf.

The closed position of the cartridge lock feature is designed such that it may be changed only while the cartridge magazine 14 is not installed in the cartridge feeder 10. After the cartridge magazine is installed in the cartridge feeder, access to the lock arm 105 is prevented by the feeder bezel 48 and the bezel shroud 50 so the state of the lock cannot be changed. In this way, the closed position can facilitate the selection of certain operating modes of the cartridge feeder, which are described further below. The closed position ensures that, if a cartridge magazine is loaded in the cartridge feeder with the lock in the closed position, then cartridges cannot be removed or replaced by an operator, but can be removed and returned only by the feeder 10.

Figure 9:
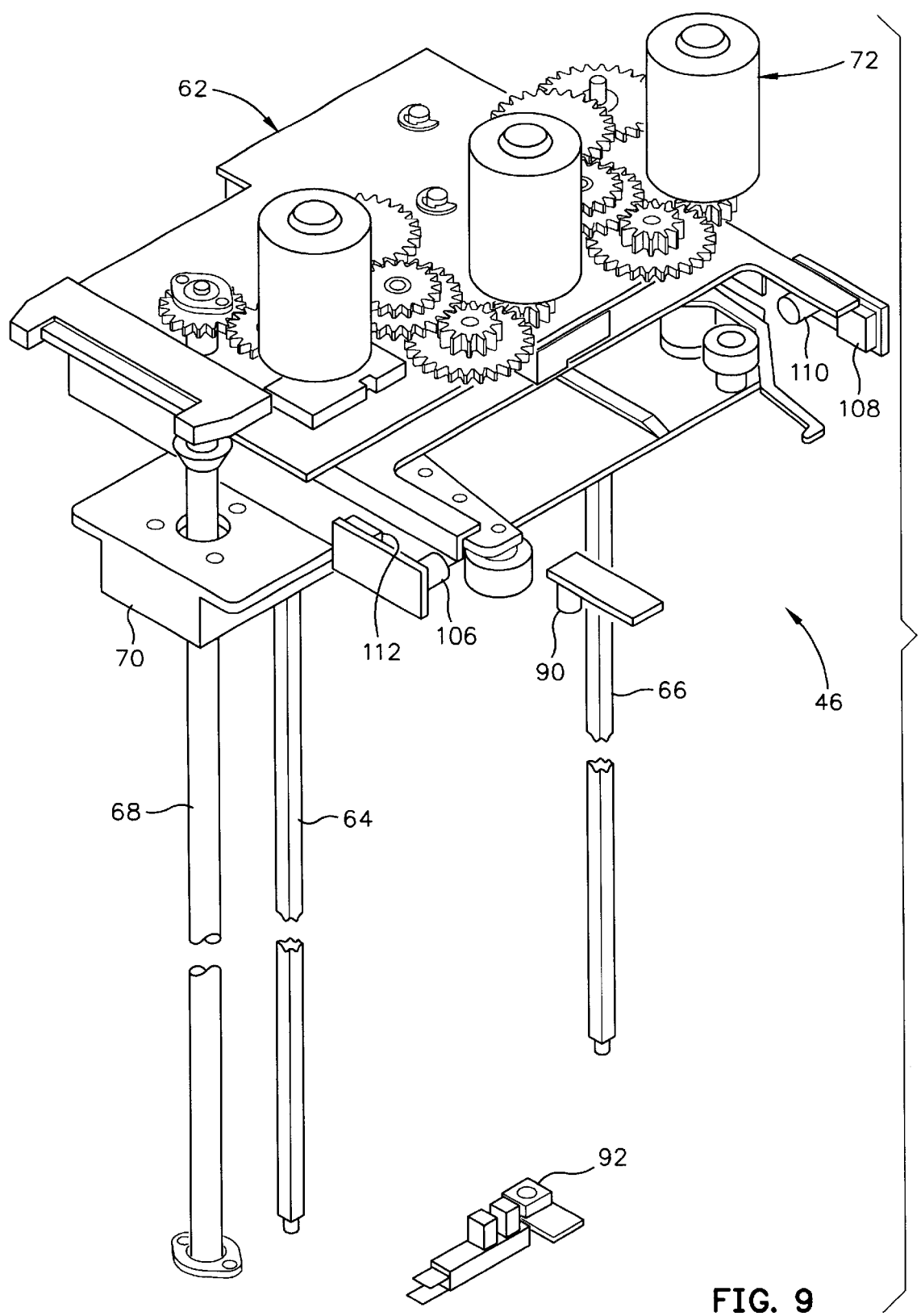
FIG. 9 is a perspective view of the cartridge transport assembly illustrated in FIG. 2.

FIG. 9 shows the cartridge transport assembly 46 in a position from which it can move vertically between its home position adjacent the priority slot (not illustrated in FIG. 9) and any shelf of a magazine mated with the feeder. The cartridge feeder tray 62 includes a cartridge presence sensor system comprising an export emitter 106-receiver 108 pair and an import emitter 110-receiver 112 pair. The export emitter-receiver pair detects if a cartridge is present in the export position on the particular shelf or slot at which the feeder tray is located. The import emitter-receiver pair detects if a cartridge is present in the import position on a shelf or the priority slot. The emitter 106, 110 produces a beam that is received by the associated receiver 108, 112. If a cartridge is in the import position and the feeder tray 62 is adjacent the cartridge, then both beams will be prevented from being received by their respective receivers. This indicates an import cartridge. If only the beam from the export emitter 106 is prevented from being received, then a cartridge in the export position is indicated. The cartridge presence sensor system is part of the cartridge/magazine sensor system 86 illustrated in FIG. 3 and is used by the drive unit CPU 80 in locating, for example, the next available, unoccupied magazine shelf. Finding the next available shelf is critical for operation of some of the feeder operating modes described further below.

The cartridge feeder 10 can be operated in one of six operating modes. These operating modes comprise manual mode, automatic mode, system mode, accumulate mode, random mode, and library mode. The cartridge feeder mode is selected by an operator from menus on the LCD panel 24 using the control buttons 26, with the exception of library mode, which is automatically set by a library system connection. Each of the operating modes will be described in turn below.

Figure 10:
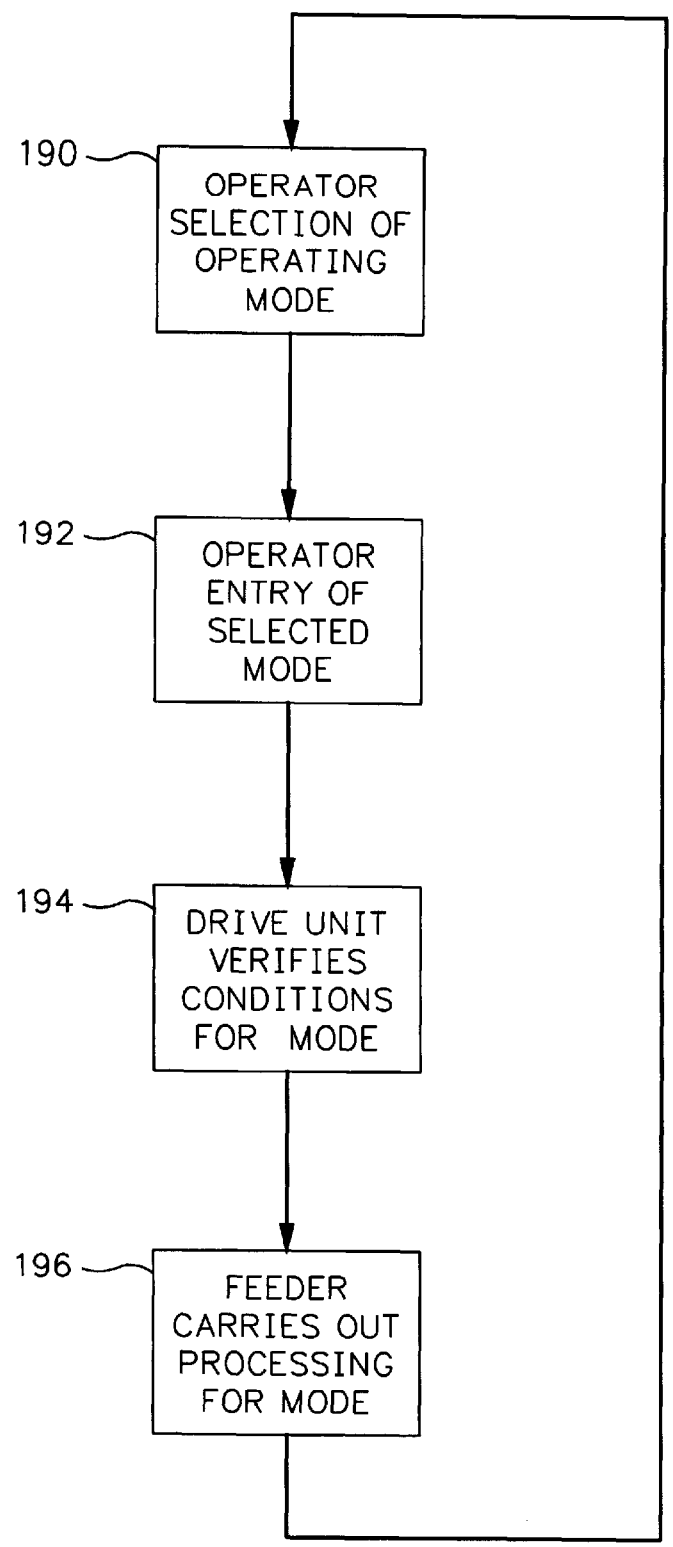
FIGS. 10, 11 and 12 include flow diagrams illustrating operation of the feeder and drive unit shown in FIG. 1.

The operation of the cartridge feeder 10 when engaged with the drive unit 20 is represented by the steps of the flow diagram illustrated in FIG. 10. The flow diagram steps can be implemented as a software program in the drive unit CPU 80. First, an operator selects a desired operating mode from among a list of modes displayed on the LCD panel 24, as indicated by the box numbered 190. The selection is made, for example, by using the control buttons 26 to designate an operating mode. The designation is entered with the drive unit CPU at the box numbered 192. Entry of the designation can be made by pressing an "ENTER" control button. At box 194, the drive unit CPU verifies that the proper conditions are present for operation of the desired mode. Discrepancies are signalled to the operator via the LCD panel. Finally, the feeder carries out cartridge movement from the priority slot and cartridge magazine to the drive unit and back again, as indicated by the box numbered 196. Details of the operating modes are described below.

Figure 11:
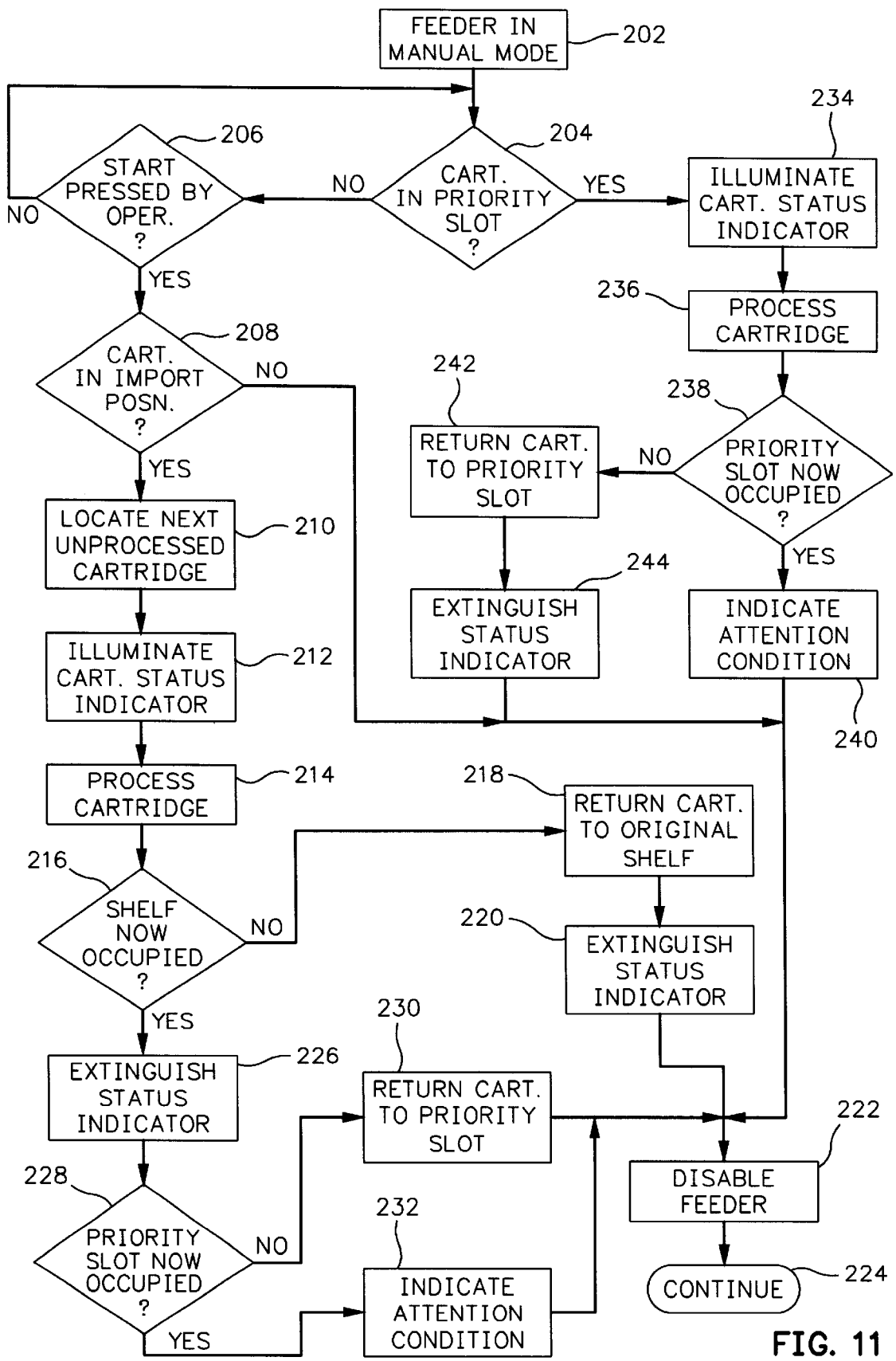

FIG. 11 is a flow diagram that illustrates the steps followed in the operation of the manual mode. The flow diagram can be implemented as a software program in the drive unit CPU 80. The manual mode permits an operator to load cartridges one at a time. First, the operator places the feeder 10 in the manual mode (represented by the box numbered 202) by selecting and entering manual mode from the LCD display 24 using the control buttons 26. The drive unit 20 will check to determine if a cartridge is present in the priority slot, illustrated by the box numbered 204. If a cartridge is present, it will be processed. If one is not present, then the drive unit CPU will check to determine if a START button was pressed on the control panel 25, at box 206.

If the START button was not pressed, then the drive unit CPU 80 will cycle back to checking for a cartridge in the priority slot at box 204. If the START button was pressed, the drive unit CPU 80 will use the global cartridge detecting system illustrated in FIG. 4 and determine if at least one shelf of the cartridge magazine 14 contains a cartridge in the import, or unprocessed, position. This determination is represented by the decision box numbered 208. If no unprocessed cartridge can be located, then the feeder is placed in a disabled state in which it simply awaits further commands from the operator, indicated by the disable feeder box numbered 222 and the continue box numbered 224. If an unprocessed cartridge is located in the magazine, an affirmative outcome at the box numbered 208, then the cartridge feeder tray 62 indexes down the cartridge magazine until it locates the first shelf having a cartridge in the import position, as indicated by the box numbered 210. Locating a cartridge is achieved by the drive unit CPU indexing the cartridge feeder tray 62 down the magazine 14 until the cartridge presence sensor system illustrated in FIG. 9 indicates the presence of an unprocessed cartridge.

Next, at the box numbered 212, the cartridge status indicator for the shelf with the unprocessed cartridge is continuously illuminated green to indicate it is in use. At the box numbered 214, the unprocessed cartridge is transported to the feeder and processed. After the cartridge is processed, the feeder attempts to return it to the shelf from which it was obtained. At the box numbered 216, the drive unit CPU checks to determine if a cartridge now occupies the shelf from which the unprocessed cartridge was obtained. If the cartridge presence sensor system indicates the shelf is still empty, then at the box numbered 218 the cartridge is returned to its original shelf. The cartridge status indicator for that shelf is extinguished at the box numbered 220. Finally, the feeder is placed in the disabled state at the box numbered 222.

If the magazine shelf from which the cartridge was obtained is occupied, that is, if the operator has placed an unprocessed cartridge in the magazine shelf, this constitutes an affirmative response at the decision box numbered 216. At the box numbered 226, the drive unit extinguishes the cartridge status indicator for the shelf in question. At the box numbered 228, the drive unit CPU attempts to return the processed cartridge to the priority slot 16 and first checks to determine if the priority slot is occupied. If the priority slot is not occupied, then at the box numbered 230 the processed cartridge is returned to the priority slot. The feeder is then placed in the disabled condition as indicated by the boxes numbered 222 and 224. If the priority slot also is occupied by a cartridge, then at the box numbered 232, the drive unit CPU illuminates the priority slot cartridge status indicator with a flashing yellow light to indicate an attention condition. The feeder then enters the disabled state and waits for further action, as indicated by the boxes 222 and 224.

In the manual mode, the feeder also accepts cartridges in the priority slot 16. At the box numbered 204, if the feeder is in the manual mode and a cartridge is placed in the priority slot, then the drive unit CPU illuminates the priority slot cartridge status indicator to a steady green light to indicate that the cartridge is in use, as indicated by the box numbered 234. The cartridge is then processed at the box numbered 236. The feeder then attempts to return the cartridge to the priority slot at the decision box numbered 238. If the priority slot is occupied, then at the box numbered 240 the priority slot cartridge status indicator is illuminated with a flashing yellow light to indicate an attention condition. The feeder then is placed in the disabled state at the boxes numbered 222 and 224. If the priority slot is not occupied after the priority cartridge is processed, then the cartridge is returned to the priority slot at the box numbered 242, the priority slot cartridge status indicator is extinguished at the box numbered 244, and the feeder is placed in the disabled state at the boxes numbered 222 and 224.

The flow diagram shows that the manual mode will be discontinued and operation of the cartridge feeder 10 will be halted when a magazine cartridge 18 has been processed and returned to its original location, and there is no cartridge in the import position of the priority slot 16. The flow diagram shows that manual mode also will be discontinued if an operator selects manual mode by pressing "start feeder" on the cartridge control panel 22, but the cartridge feeder cannot detect a cartridge in the import position in any shelf of the cartridge magazine 14. FIG. 10 shows that the manual mode will be discontinued and operations halted also if an extra cartridge condition is discovered, that is, if the cartridge feeder completes processing of a cartridge only to discover that there is no location (empty slot or shelf) to which the processed cartridge can be returned. Finally, the flow diagram shows that the manual mode will be halted if a magazine is not installed and an operator presses the start cartridge feeder button on the control panel.

In the manual mode, if the cartridge 18 is placed in the priority slot 16 of the cartridge feeder 14 while the cartridge feeder 10 is processing a cartridge or is otherwise busy, and the manual mode has been selected, then the cartridge feeder will activate the cartridge status indicator of the priority slot to be steadily illuminated green. When the cartridge feeder completes its current operation, the cartridge feeder will automatically transport the cartridge in the priority slot 16 to the drive unit 20.

The accumulate mode permits an operator to process cartridges one at a time and accumulate the processed cartridges in the cartridge magazine 14. In the accumulate mode, cartridges are always received from the priority slot 16 for processing and are returned to a magazine shelf 28 after processing. This permits an operator to insert specific cartridges into the priority slot and accumulate the processed cartridges in the magazine for later disposition. It is not necessary that the cartridge magazine be empty prior to the start of the accumulate mode.

Figure 12:
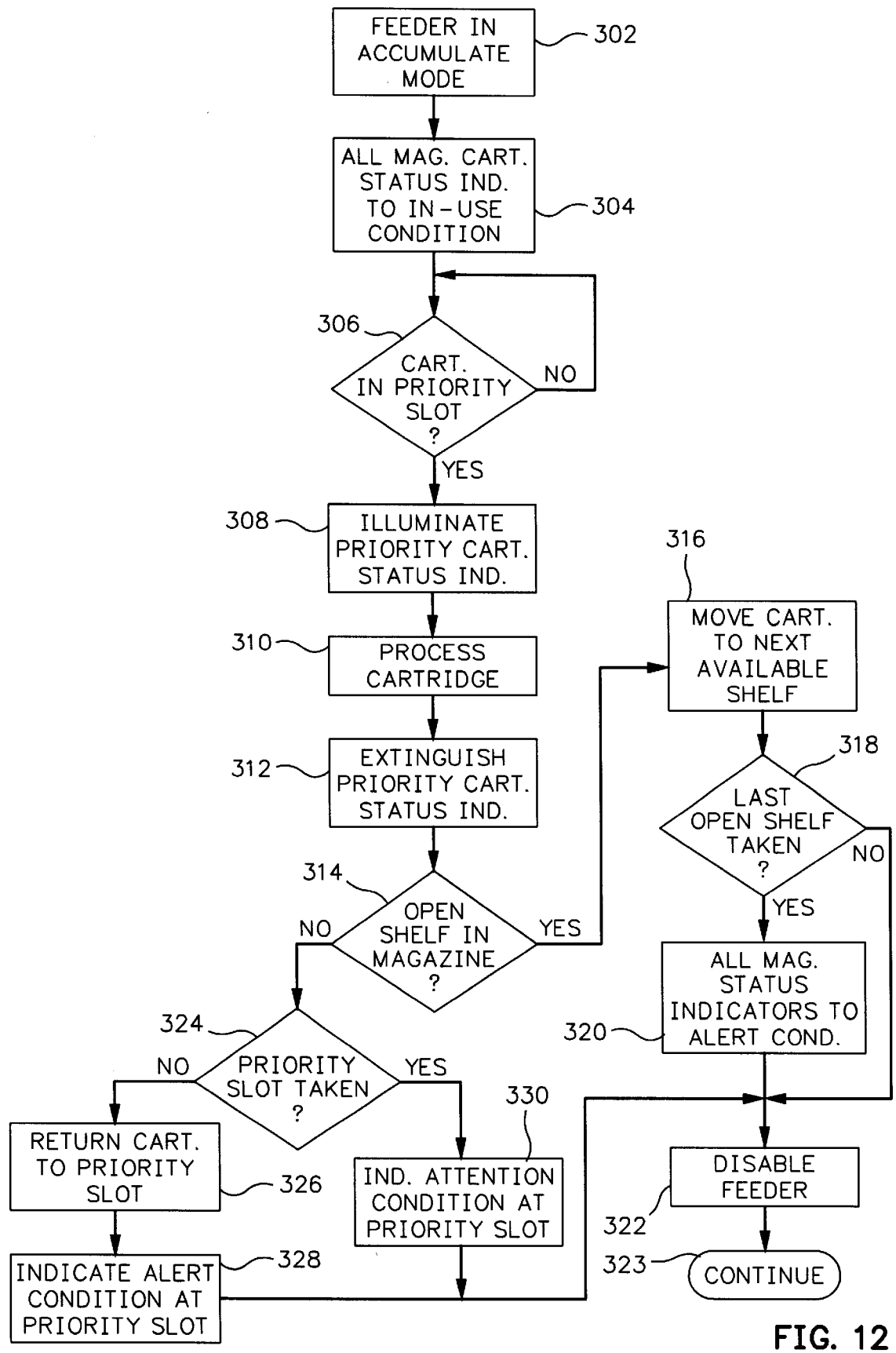

FIG. 12 is a flow diagram that illustrates the accumulate mode. The flow diagram can be implemented as a software program in the drive unit CPU 80. After the operator places the feeder 10 in the accumulate mode by selecting and entering accumulate mode, as indicated by the box numbered 302, the cartridge status indicators 30 for all magazine shelves 28 are set to indicate the associated cartridge is in use, that is, the indicator for each magazine shelf is illuminated in a steady green color at the box numbered 304. This reminds an operator that the entire cartridge magazine 14 is reserved for use as the accumulate mode hopper. The accumulate mode processing is started by inserting a cartridge into the priority slot in the import position, as indicated by the decision box 306.

If a cartridge is not placed in the priority slot 16, then the feeder 10 remains waiting in the accumulate mode, as indicated by the control line proceeding from the negative outcome of the decision box 306 back to its input. If a cartridge is placed in the priority slot, then the cartridge status indicator for the priority slot is illuminated in a steady green light to indicate that the cartridge is in use, as indicated by the box numbered 308. When the drive unit 20 is available, the cartridge is loaded from the priority slot into the drive unit and processed, as indicated by the box numbered 310. When the cartridge is loaded from the priority slot, the priority slot cartridge status indicator is extinguished (box 312). After the cartridge received from the priority slot is processed, the feeder retrieves the cartridge from the drive unit and checks to determine if any open shelves are available in the magazine 14, as indicated at the decision box numbered 314. An open shelf is located by indexing the cartridge feeder tray 62 down the cartridge magazine 14 until the cartridge presence sensor system illustrated in FIG. 9 indicates a shelf is empty. If an open shelf is available, then at the box numbered 316 the cartridge is moved to the next available magazine shelf.

At the box numbered 318, if the cartridge placed in the magazine now occupies what was the last available magazine shelf, an affirmative response at the box numbered 318, then all of the cartridge status indicators associated with the cartridge magazine are steadily illuminated yellow to indicate an alert condition at the box numbered 320. The feeder is then placed in a disabled condition in which it simply awaits further commands, indicated by the disable box numbered 322 and the continue box 323. If the cartridge did not occupy the last available slot of the magazine, then processing is continued at the box numbered 322 without indicating an alert condition. Placing a cartridge in the last available magazine shelf can be detected, for example, because the drive unit CPU detects when the cartridge feeder tray 62 is at the bottom of its range of travel.

If a cartridge is processed and no open magazine shelves are available, a negative response at the decision box numbered 314, then the drive unit CPU next determines if the priority slot 16 is occupied at the box numbered 324. If the priority slot is not occupied, then at the box numbered 326 the cartridge is returned to the priority slot and the priority slot cartridge status indicator is illuminated steady yellow to indicate an alert condition at the box numbered 328. Processing is continued in the accumulate mode at the feeder disable box numbered 322. If the priority slot is occupied at the decision box numbered 324, then the priority slot cartridge status indicator is illuminated flashing yellow at the box numbered 330 to indicate an attention condition and, at the box numbered 322, operation is continued.

In view of the diagrams of FIG. 10, FIG. 11, and FIG. 12, which help explain the overall operation of the feeder 10, as well as the manual and accumulate modes, the remaining modes of operation should be understandable without illustration using flow diagrams.

In the automatic mode, an operator can keep the drive unit 20 continually busy with cartridges 18 from the cartridge magazine 14. The cartridge feeder 10 will automatically feed cartridges from the cartridge magazine to the drive unit sequentially until all of the cartridges in the magazine have been processed. The operator can supply specific cartridges to the drive unit, as requested by an application program running on a host computer, by simply inserting the desired cartridge into the priority slot 16. The priority cartridge will be automatically selected by the cartridge feeder 10 as the next cartridge to be transported to the drive unit 20. When the priority cartridge is processed, the cartridge feeder will automatically return the processed cartridge to the priority slot and resume processing cartridges from the cartridge magazine. The cartridge feeder will select unprocessed cartridges from the cartridge magazine in their order of availability.

In the automatic mode, processed cartridges can be removed from the cartridge magazine 14 and unprocessed cartridges can be added in their place, without disturbing the operation of the cartridge feeder 10. The cartridge feeder will continue to select the next available unprocessed cartridge in its operation. When the automatic mode is begun, the cartridge feeder is initialized so that the top of the cartridge magazine is considered to be the current shelf. The cartridge feeder can be operated in the automatic mode by selecting the automatic mode on the LCD panel 24 and pressing the start button on the operator panel 25. The automatic mode will be automatically disabled when the last cartridge has been processed and returned to its original shelf 28 or to the priority slot 16 and there is no cartridge remaining in either the priority slot or a shelf of the magazine in the import (unprocessed) position. The automatic mode will not start and will be disabled if the automatic mode is selected and the start button is pressed but no cartridge in either the magazine or the priority slot is in the import position. Lastly, the automatic mode will be disabled if an attention condition is discovered by the cartridge feeder.

The system mode provides an operator with an additional mechanism for keeping the drive unit 20 continually fed with cartridges from the cartridge magazine 14. The system mode is similar to the automatic mode, except that control of cartridge loading is given over to the command of an application program run by a host computer, also referred to as the initiator. That is, after the first unprocessed cartridge is removed from the magazine and transported to the drive unit, subsequent load commands are under the control of the initiator. The cartridge feeder 10 will load a cartridge 18 in response to each command from the initiator until all of the cartridges in the cartridge magazine 14 have been processed. Even in the system mode, however, an operator can supply specific cartridges to an application program simply by inserting a cartridge into the priority slot. The priority cartridge will automatically be the next cartridge selected by the cartridge feeder. When the priority cartridge is processed, the cartridge feeder will automatically resume processing cartridges from the cartridge magazine under control of the initiator.

As with the automatic mode, processed cartridges can be removed from the cartridge magazine 14 during the system mode and unprocessed cartridges can be substituted in their place, without disruption to operation of the cartridge feeder 10. The system mode can be enabled by selecting the system mode on the display panel 24 and pressing the "START" button on the operator panel 25. The system mode will automatically be disabled if all cartridges have been processed and no remaining cartridge in either the cartridge magazine 14 or the priority slot 16 is in the import position. Likewise, the system mode will be disabled if the cartridge feeder cannot detect a cartridge in the import position in either the magazine or the priority shelf at the initiation of the system mode. Finally, the system mode will be disabled if an attention condition is discovered by the cartridge feeder.

The random mode permits the cartridge feeder 10 to act as a self-contained library of cartridges controlled entirely by the initiator 88. The initiator produces commands that select a cartridge 18 from a given magazine shelf 28, processes the cartridge, and returns it to a magazine shelf. Control of the source shelf and destination shelf are left entirely to the initiator and need not be the same shelf. A cartridge placed in the priority slot will not automatically be the next cartridge processed by virtue of command from the drive unit. The cartridge feeder and drive unit will notify the initiator (or host processor) of the presence of a cartridge in the priority slot, but the initiator itself must specifically address the cartridge in the priority slot to access that cartridge. That is, in the random mode, the priority slot is simply another addressable cartridge location accessed by the host processor. Moreover, in the random mode, cartridges can be removed and inserted from the feeder through the priority slot.

To ensure the integrity of the sequence of cartridges in the cartridge magazine 14 when in the random mode, the drive unit CPU preferably requires that the cartridge lock mechanism be in the closed position illustrated in FIG. 6. This prevents the addition or removal of cartridges from the magazine once it is locked and installed in the cartridge feeder. The state of the cartridge lock can be sensed by the cartridge feeder. The cartridge/magazine sensor system 86 of the cartridge feeder also permits the drive unit to determine that the magazine is not installed or has been removed, which will result in disabling the random mode. Because the cartridge magazine must be locked closed during the random mode, the priority slot is used as an input/output port to the magazine library so that cartridges can be added or removed from the magazine by the drive unit and feeder without having to violate the integrity of the locked magazine. That is, the initiator, under its own control, can move cartridges from the priority slot to any empty magazine shelf, or to the drive unit itself, or can move cartridges from a magazine shelf, or the drive unit, to the priority slot. Library inventory and the control of that inventory is entirely the responsibility of the initiator in the random mode and cannot be changed by the operator.

Random mode will be enabled only if the following three conditions are met: first, a magazine must be installed in the cartridge feeder, second, the cartridge lock must be in the closed state, and finally, the operator must select the start button on the control panel of the cartridge feeder. The cartridge feeder will be disabled if the cartridge magazine is removed from the cartridge feeder, or if an attention condition is discovered by the cartridge feeder. In the random mode, all of the cartridge magazine shelf status indicators are set to a steady green illumination to indicate the in-use condition. The indicators remain in that condition unless random mode is disabled.

The library mode is designed to support automated cartridge libraries. An example of an automated library is the IBM 3495 tape library data server system. The library mode of the cartridge feeder 10 applies only when the drive unit 20 is installed in a library configuration. The drive unit is directed to enter library mode by the initiator; library mode is not a function that can be invoked by an operator through the operator panel. The cartridge feeder operation in the library mode is similar to operation in the system mode in that the loading of a cartridge is controlled by the initiator, where the cartridge feeder uses the system command to initiate a magazine search for an available cartridge. The removal and addition of cartridges to the cartridge magazine and the priority slot are performed by the automated library, typically by using robotics. The magazines themselves, however, are not typically removed by the robotics.

Thus, the present invention provides a cartridge feeder that accepts a cartridge magazine and that also has a separate priority slot that receives cartridges one at a time for priority processing. In this way, a cartridge feeder in accordance with the present invention provides the benefits of single feed systems and conventional magazine systems, while reducing any negative aspects of such systems. Such a configuration permits a variety of unique operating modes to be implemented.

The present invention has been described above in terms of a presently preferred embodiment so that an understanding of the present invention can be conveyed. There are, however, many configurations for cartridge feeders not specifically described herein, but with which the present invention is applicable. The present invention should therefore not be seen as limited to the particular embodiment described herein, but rather, it should be understood that the present invention has wide applicability with respect to cartridge feeders generally. All modifications, variations, or equivalent arrangements that are within the scope of the attached claims should therefore be considered to be within the scope of the invention.

We claim:

1. A cartridge feeder system for engagement with a drive unit and for providing cartridges to the drive unit for processing, the feeder system comprising:
   a magazine port that mates with a removable cartridge magazine having a plurality of shelves adapted to receive a cartridge for processing by the drive unit;
   a priority slot separate from the magazine port and adapted to directly receive a cartridge for processing by the drive unit; and
   a transport mechanism that exchanges cartridges between the magazine port and the drive unit by performing steps comprising:
   exchanging cartridges between cartridge shelves of the cartridge magazine and the drive unit;
   detecting placement of a cartridge in the priority slot; and
   in response to said detection, interrupting said cartridge exchange to transport the priority slot cartridge to the drive unit.

2. A cartridge feeder system as defined in claim 1, wherein the transport mechanism is adapted to return the cartridge from the drive unit to the shelf or priority slot location from which it was retrieved.

3. A cartridge feeder system as defined in claim 2, wherein the transport mechanism is adapted to return the cartridge received from the priority slot to the next available, unoccupied shelf of the cartridge magazine.

4. A cartridge feeder system as defined in claim 1, wherein the transport mechanism includes a cartridge-receiving tray that can move from an initial position adjacent the priority slot or adjacent the removable cartridge magazine for receiving a cartridge to a position adjacent the drive unit and back again for returning the cartridge.

5. A cartridge feeder system as defined in claim 4, wherein the transport mechanism includes a sensor assembly that indicates if a cartridge is present in the priority slot or in a shelf of the cartridge magazine.

6. A cartridge feeder system as defined in claim 5, wherein the sensor assembly is adapted to distinguish between processed and not processed cartridges that are either on a shelf of the cartridge magazine or in the priority slot.

7. A cartridge feeder system as defined in claim 5, wherein the transport mechanism is adapted to move from a position adjacent the priority slot to a position adjacent any one of the cartridge magazine shelves and the system further includes a controller that controls movement of the transport mechanism such that, if the cartridge-receiving tray has received a cartridge from a magazine shelf and upon returning the tray to the magazine the sensor assembly indicates that the shelf is occupied by a cartridge, then the controller moves the transport mechanism to the priority slot.

8. A cartridge feeder system as defined in claim 7, wherein the controller indicates an attention condition if the sensor assembly indicates the priority slot also is occupied with a cartridge after the transport mechanism was moved from the original cartridge magazine shelf to the priority slot.

9. A cartridge feeder system as defined in claim 7, wherein the controller comprises a logic card that is coupled to a central processor unit of the drive unit.

10. A cartridge feeder adapted for engagement with a drive unit that includes a drive unit central processor and a cartridge transport and read/write heads for processing cartridges, the cartridge feeder adapted to provide a cartridge to the drive unit and retrieve a processed cartridge from the drive unit, the cartridge feeder comprising:

a control panel for receiving commands from an operator;

a display panel for displaying messages to the operator;

a movable feeder transport assembly;

a receiving slot adapted to mate with a cartridge magazine having a plurality of shelves upon which cartridges can be placed, the receiving slot permitting the feeder transport assembly to receive cartridges from the magazine for transport to the drive unit; and a priority slot separate from the receiving slot, said priority slot being adapted to directly receive a cartridge such that the cartridge can be received by the feeder transport assembly for transport to the drive unit regardless of the cartridge magazine being mated;

wherein the movable feeder transport assembly exchanges cartridges with the drive unit by performing steps comprising:

exchanging cartridges between the receiving slot and the drive unit;

detecting placement of a cartridge in the priority slot; and in response to said detection interrupting said cartridge exchange to transport the priority slot cartridge to the drive unit.

11. A cartridge feeder as defined in claim 10, wherein the feeder transport assembly returns the processed cartridge from the drive unit to the magazine shelf or priority slot from which it was received.

12. A cartridge feeder as defined in claim 11 wherein the feeder transport assembly is adapted to return the processed cartridge received from the priority slot to the next available unoccupied shelf of the cartridge magazine.

13. A cartridge feeder as defined in claim 11, wherein the feeder transport mechanism includes a sensor assembly that indicates if a cartridge is present in the priority slot or in a shelf of the cartridge magazine.

14. A cartridge feeder as defined in claim 13, wherein the feeder transport assembly is adapted to receive a cartridge from a shelf of the cartridge magazine and return the processed cartridge to the shelf after processing and is further adapted to return the processed cartridge to the priority slot if the sensor assembly indicates that the magazine shelf is occupied by a cartridge.

15. A cartridge feeder as defined in claim 14, wherein the cartridge feeder further comprises a plurality of cartridge status indicators that indicate the status of the priority slot and each shelf of the cartridge magazine.

16. A cartridge feeder as defined in claim 15, wherein the status indicator of the priority slot indicates an attention condition if the sensor assembly indicates the priority slot is occupied with a cartridge when the feeder transport assembly unsuccessfully attempts to return the processed cartridge to the cartridge magazine.

17. A cartridge feeder as defined in claim 10, wherein the cartridge feeder is operable in an automatic mode in which all shelves of the cartridge magazine can be loaded with a cartridge and the drive unit central processor can sequentially process the cartridges in the magazine and further will interrupt its processing of cartridges in the magazine to process a cartridge placed in the priority slot and then return the processed priority cartridge to the priority slot.

18. A cartridge feeder as defined in claim 17, wherein the drive unit completes processing of a cartridge when a cartridge is placed in the priority slot prior to processing the priority cartridge.

19. A cartridge feeder as defined in claim 10, wherein the cartridge feeder is operable in an accumulate mode in which cartridges are received from the priority slot, processed by the drive unit, and returned to the next available empty shelf in the cartridge magazine.

20. A cartridge feeder as defined in claim 10, wherein the cartridge feeder is operable in an automatic mode in which the cartridge feeder receives cartridges from the magazine and the drive unit central processor automatically selects the next cartridge in sequence, and further can receive an interrupt request for a specific cartridge from a host computer and will automatically process a cartridge placed in the priority slot as the next cartridge to be processed.

21. A cartridge feeder as defined in claim 10, wherein the cartridge is operable in a system mode in which the drive unit central processor controls the receiving, processing, and return of cartridges from the cartridge magazine.

22. A cartridge processing system for use with a host processor, the cartridge processing system comprising:

a drive processor that communicates with the host processor and receives cartridges for processing;

a cartridge feeder that mates with the drive processor and transports cartridges serially to and from the drive processor, the cartridge feeder including a magazine port adapted to mate with a removable cartridge magazine having a plurality of shelves upon which cartridges can be placed, and including a priority slot separate from the magazine port and being adapted to directly receive a cartridge, with or without the cartridge magazine being inserted into the magazine port, wherein:

the cartridge feeder is adapted to exchange cartridges with the drive processor by performing steps comprising:

exchanging cartridges between the magazine port and the drive processor;

detecting placement of a cartridge in the priority slot; and in response to said detection, interrupting said cartridge exchange to transport the priority slot cartridge to the drive unit.

23. A system as defined in claim 22, wherein the cartridge feeder includes a movable feeder transport that returns to an initial position adjacent the priority slot after an unprocessed cartridge has been retrieved and transported to the drive unit or after a processed cartridge has been transported from the drive unit and returned to the location from which it was retrieved.

24. A system as defined in claim 22, wherein the cartridge feeder includes a movable feeder transport assembly that can move from an initial position adjacent either the priority slot or the cartridge magazine for retrieving a cartridge to a position adjacent the drive unit and back again.

25. A system as defined in claim 24, wherein the feeder transport includes a sensor system that indicates if a cartridge is present in the priority slot or in a shelf of the cartridge magazine.

26. A system as defined in claim 25, wherein the feeder transport sensor system is adapted to distinguish between a cartridge on a magazine shelf or in the priority slot that has been processed and one that has not been processed.

27. A system as defined in claim 22, wherein the cartridge feeder is further adapted to operate in a random mode in which the feeder transport retrieves cartridges from a mated cartridge magazine under control of the drive unit processor and retrieves cartridges from the priority slot under control of the host processor.

28. A system as defined in claim 27, wherein the drive unit processor will not enable the random mode unless the cartridge feeder is mated with a cartridge magazine having a cartridge lock that is in a locked position such that cartridges cannot be removed and inserted from the mated magazine.

29. A method of receiving cartridges at a cartridge feeder engaged with a drive unit and of providing the cartridges to the drive unit for processing, the method comprising the steps of:
 (a) operating the cartridge feeder to exchange cartridges between the drive unit and cartridge shelves of a cartridge magazine removably mated to the cartridge feeder at a magazine slot therein;
 (b) receiving a cartridge directly from a priority slot defined in the cartridge feeder, said priority slot being separate from the magazine slot;
 (c) detecting placement of the cartridge in the priority slot;
 (d) in response to said detection, interrupting said cartridge exchange to transport the received priority cartridge to the drive unit.

30. A method as defined in claim 29, wherein the step of operating the cartridge feeder comprises the steps of:
 (b)(2)(i) moving a transport mechanism of the cartridge feeder to a first shelf of the cartridge magazine;
 (b)(2)(ii) detecting if the first shelf contains a cartridge;
 (b)(2)(iii) moving the transport mechanism to a next shelf of the cartridge magazine if no cartridge was detected on the first shelf;
 (b)(2)(iv) repeating the steps of detecting and moving until a shelf of the cartridge magazine is detected to contain a cartridge.

31. A method as defined in claim 29, wherein the step of operating the cartridge feeder comprises:
 (b)(1) moving a transport mechanism of the cartridge feeder to a shelf of the cartridge magazine having a cartridge; and
 (b)(2) withdrawing the cartridge from the shelf for transport by the transport mechanism.

32. A method as defined in claim 31, wherein the step of moving comprises the steps of:
 (b)(1)(i) moving the transport mechanism to a first shelf of the cartridge magazine;
 (b)(1)(ii) detecting if the first shelf contains a cartridge;
 (b)(1)(iii) moving the transport mechanism to a next shelf of the cartridge magazine if no cartridge was detected on the first shelf;
 (b)(1)(iv) repeating the steps of detecting and moving until a shelf of the cartridge magazine is detected to contain a cartridge.

33. A method as defined in claim 29, wherein the step of operating the cartridge feeder comprises the steps of:
 (d)(1) moving a cartridge-containing transport mechanism of the cartridge feeder to the shelf of the cartridge magazine;
 (d)(2) detecting if the shelf contains a cartridge;
 (d)(3) moving the transport mechanism to a next shelf of the cartridge magazine if the shelf was detected to contain a cartridge;
 (d)(4) repeating the steps of detecting and moving until a shelf of the cartridge magazine is detected not to contain a cartridge; and
 (d)(5) returning the cartridge to the shelf not containing a cartridge.

34. A method as defined in claim 33, wherein the step of returning further comprises the steps of:
 (d)(5)(i) returning the cartridge to a first shelf detected not to contain a cartridge; and
 (d)(5)(i) returning the cartridge to the priority slot of the cartridge feeder if all the shelves of the cartridge magazine are detected to contain a cartridge.

35. A cartridge feeder for engagement with a drive unit having an interface slot at which the drive unit receives cartridges from the cartridge feeder for internal processing the cartridge feeder comprising:
 a magazine port that receives a removable cartridge magazine for mating engagement therewith, the cartridge magazine having a plurality of shelves, each of which can receive a cartridge,
 a priority slot that directly receives a cartridge, said priority slot being separate from the magazine port; and
 a transport mechanism that exchanges cartridges between shelves of the magazine and the drive unit interface slot, said mechanism detecting placement of a cartridge in the priority slot and in response to said detection interrupting said cartridge exchange to transport the priority slot cartridge to the interface slot.

36. A cartridge feeder as defined in claim 35, wherein the transport mechanism returns a cartridge from the drive unit to the shelf or priority slot location from which it was retrieved.

37. A cartridge feeder as defined in claim 36, wherein the transport mechanism returns a cartridge received from the priority slot to the next available, unoccupied shelf of the cartridge magazine.

38. A cartridge feeder as defined in claim 37, wherein the transport mechanism includes a sensor assembly that indicates if a cartridge is present in the priority slot or in a shelf of the cartridge magazine.

39. A cartridge feeder as defined in claim 38, wherein the sensor assembly distinguishes between processed and not processed cartridges that are either on a shelf of the cartridge magazine or in the priority slot.

40. A cartridge feeder as defined in claim 39, wherein the cartridge feeder further includes a controller that controls movement of the transport mechanism such that, if the transport mechanism has retrieved a cartridge from a cartridge magazine shelf and upon returning the cartridge to the cartridge magazine the sensor assembly indicates that the shelf is occupied by a cartridge, then the controller controls the transport mechanism to return the cartridge to the priority slot.

41. A cartridge feeder system as defined in claim 40, wherein the controller indicates an attention condition if the sensor assembly indicates the priority slot also is occupied with a cartridge after the transport mechanism was moved from the original cartridge magazine shelf to the priority slot.

* * * * *

UNITED STATES PATENT AND TRADEMARK OFFICE
CERTIFICATE OF CORRECTION

PATENT NO. : 6,259,578 B1　　　　　　　　　　　　　　　　　　　　　Page 1 of 1
DATED : July 10, 2001
INVENTOR(S) : Christiansen et al.

It is certified that error appears in the above-identified patent and that said Letters Patent is hereby corrected as shown below:

<u>Column 15,</u>
Line 31, change "response to said detection interrupting" to -- response to said detection, interrupting --

Signed and Sealed this

Second Day of April, 2002

Attest:

JAMES E. ROGAN
*Attesting Officer*　　　　*Director of the United States Patent and Trademark Office*